United States Patent [19]

Plomb

[11] Patent Number: 5,018,420
[45] Date of Patent: May 28, 1991

[54] MACHINE TOOL

[75] Inventor: Francis Plomb, Le Lignon, Switzerland

[73] Assignee: Mefina S.A., Fribourg, Switzerland

[21] Appl. No.: 283,473

[22] PCT Filed: May 20, 1988

[86] PCT No.: PCT/CH88/00096

§ 371 Date: Nov. 3, 1988

§ 102(e) Date: Nov. 3, 1988

[87] PCT Pub. No.: WO88/09249

PCT Pub. Date: Dec. 1, 1988

[30] Foreign Application Priority Data

May 22, 1987 [CH] Switzerland ............... 01971/87
Aug. 20, 1987 [CH] Switzerland ............... 03203/87

[51] Int. Cl.$^5$ ............................................. B27B 3/12
[52] U.S. Cl. .............................. 83/748; 83/571; 83/750; 83/780; 83/783; 83/785; 83/816
[58] Field of Search ............ 83/747, 748, 698, 571, 83/783, 784, 785, 786, 814, 815, 816, 817, 750, 780

[56] References Cited

U.S. PATENT DOCUMENTS

| 199,845 | 1/1878 | McChesney | 83/785 |
| 1,211,456 | 1/1917 | Lacey | 83/748 |
| 1,467,720 | 9/1923 | Field . | |
| 1,769,656 | 7/1930 | Sullenberger | 83/785 |
| 2,005,961 | 6/1935 | Telesky | 83/785 |
| 2,253,515 | 8/1941 | Grob et al. | 83/784 |
| 2,735,457 | 2/1956 | Raspanti | 83/784 |
| 2,780,249 | 2/1957 | Andreae et al. | 83/748 |
| 2,810,410 | 10/1957 | Alsina | 83/785 |

FOREIGN PATENT DOCUMENTS

| 130936 | 1/1985 | European Pat. Off. . | |
| 2628919 | 1/1978 | Fed. Rep. of Germany . | |
| 588928 | 6/1977 | Switzerland | 83/785 |
| 6556 | of 1915 | United Kingdom . | |

Primary Examiner—Frank T. Yost
Assistant Examiner—Scott A. Smith
Attorney, Agent, or Firm—Young & Thompson

[57] ABSTRACT

The machine tool comprises a frame (1, 2, 3) with two fixing elements (22 and 39) for fastening a scroll saw blade. The fixing element (22) is driven by an electrical motor (5) in a vertical reciprocating movement. The two fixing elements (22 and 39) are linked to each other by a metallic ribbon (45) passing on pulleys (46 to 50). The position of the pulley (47) can be changed by means of a cam (53) acting on an arm (52) so as to stretch the ribbon (45) to the desired value.

9 Claims, 4 Drawing Sheets

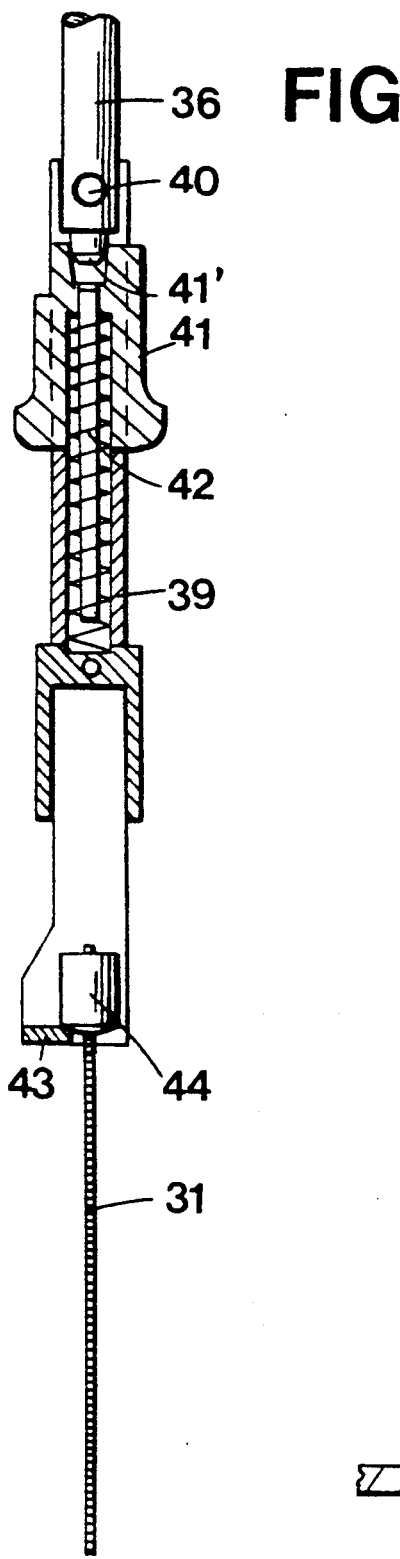
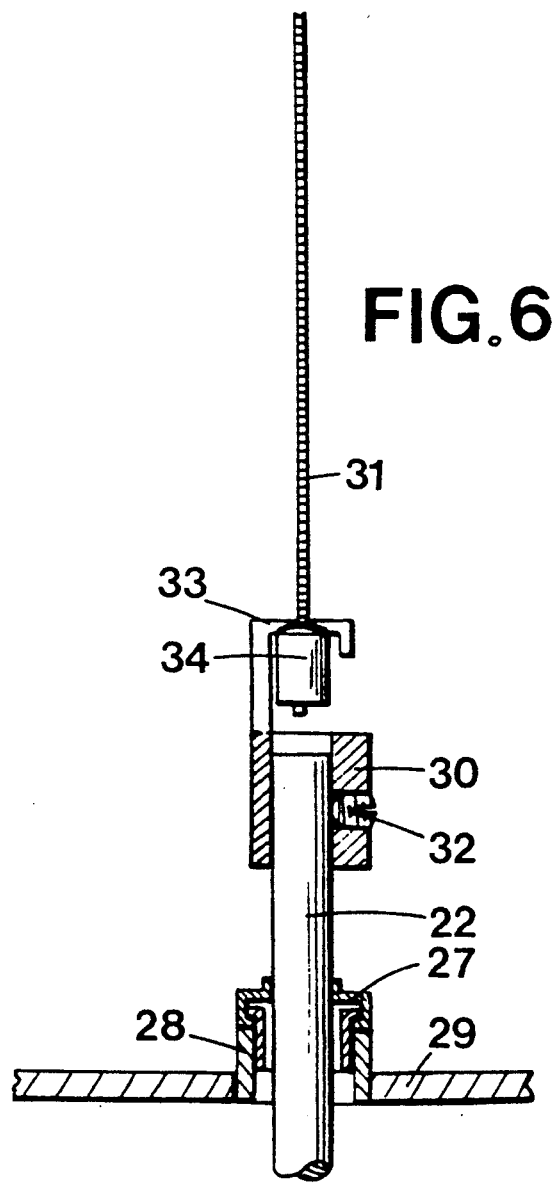

MACHINE TOOL

BACKGROUND OF THE INVENTION

The present invention relates to a machine tool comprising a hollow frame having a lateral upright, the upright linking a horizontal upper arm to a horizontal lower arm, the free ends of each of the arms being provided with fixing elements for fastening one end of a scroll saw blade and imparting to the blade a longitudinal reciprocating movement, one of the fixing elements being driven in reciprocating movement by a motor housed in the frame, the two fixing elements being linked to each other by flexible tie means, the means passing on feed pulleys and imparting the movements of the fixing element driven by the motor to the other fixing element, in order to provide the other fixing element with a force for return of the saw blade. A machine tool of this type is disclosed, for example, in U.S. Pat. No. 1,467,720.

Swiss Pat. No. 654,241, corresponding to U.S. Pat. No. 4,649,608, discloses a universal machine tool having the above-mentioned characteristics, but permitting other machining operations such as drilling, sawing with a jig-saw or with a circular saw, milling, sand papering, grinding and so on.

When the scroll saw is not in use, the fixing element for return of the saw blade occupies a position unnecessarily, which position could be better used for another purpose.

OBJECT AND SUMMARY OF THE INVENTION

The object of the present invention is to make it possible to free the position occupied by the fixing element for return of the saw blade. To this end, the machine tool according to the present invention is characterized in that the flexible tie means passes on a stretcher subjected to an elastic return action, in order to bring into a retracted position, when the saw blade is removed, the one of the two fixing elements which is not driven by the motor.

BRIEF DESCRIPTION OF THE DRAWINGS

The attached drawings show diagrammatically and by way of example an embodiment and a variant of the machine tool which is the object of the invention. However, these drawings only show the characteristics peculiar to the present invention and the reader wanting to have a complete idea of the machine is referred to the above-mentioned Swiss Patent or the corresponding U.S. patent.

FIGS. 5 and 6 show in greater detail the parts for fixing the blade of the scroll saw.

DETAILED DESCRIPTION OF PREFERRED EMBODIMENTS

Figure 1:
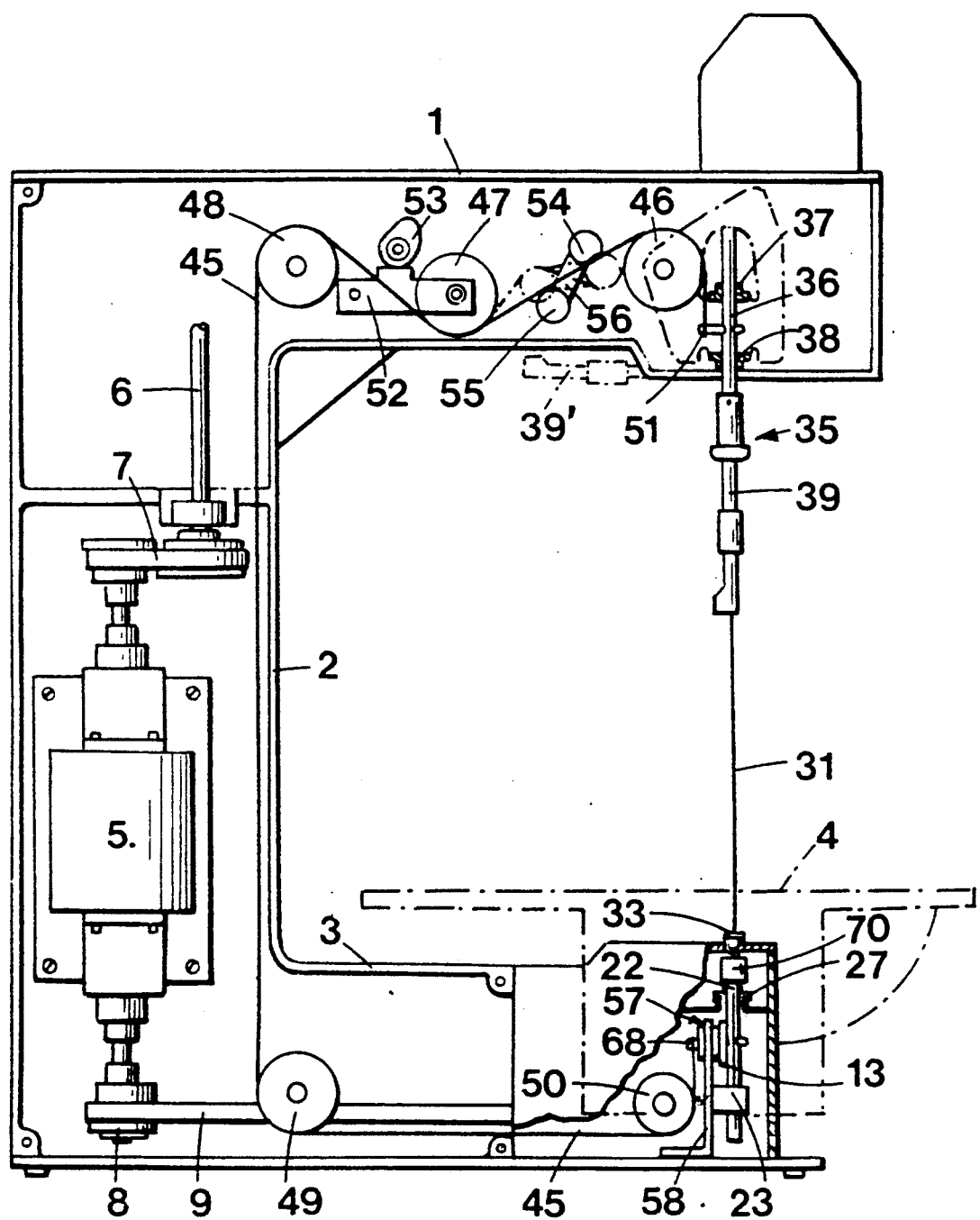
FIG. 1 is a front view, partly in section, of said embodiment.

The machine illustrated in FIG. 1 comprises a frame formed by an upper arm. 1, an upright 2 and a lower arm 3 on which is mounted a work plate 4, shown in phantom line. The upright 2 houses an electrical motor 5 intended for driving several tools which can be powered by said machine. For example, the machine may comprise a revolving spindle to constitute a drill, as is shown in U.S. Pat. No. 4,149,608. The spindle is not illustrated in the drawing since it is not part of the present invention. Only part of the driving device for this spindle has been sketched, i.e., a shaft 6, driven by the motor 5 via a belt 7.

The lower end of the shaft of the motor 5 carries a pulley 8 on which passes a belt 9 intended to drive the tools which can be fastened to the fixing elements on lower arm 3. The belt 9 drives a horizontal shaft 10, as shown in FIG. 2, by way of a constant-mesh gear for example, this type of gear being well-known itself and therefore not shown.

Figure 2:
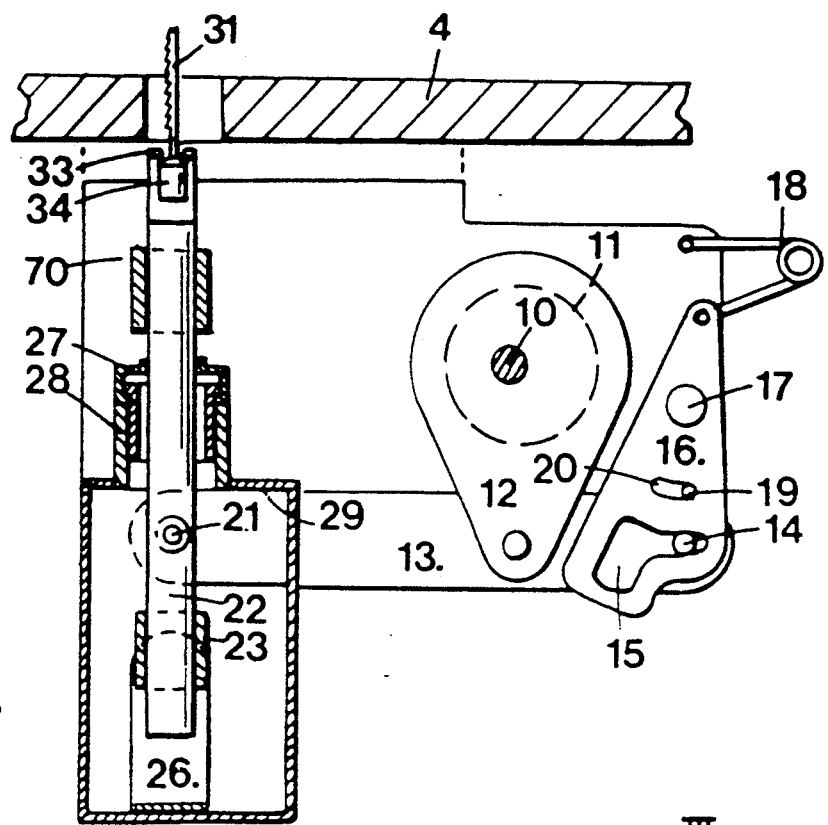
FIG. 2 shows part of the mechanism for driving the saw blade.

The shaft 10, seen in FIG. 2, is part of a mechanism intended to impart a reciprocating movement to a scroll saw. To this end, the shaft 10 carries an eccentric 11 on which is engaged the bearing of a connecting rod 12, the foot of this connecting rod being engaged on a lever 13 which carries a pivot 14, this pivot being engaged in a hollow 15 provided in a drive part 16. This drive part can pivot on a pin 17 and is subjected to the action of a swinging spring 18 capable of maintaining the drive part in one or the other of two positions, these two positions being determined by the abutment of a finger 19 against one end or the other of a slot 20 provided in the drive part 16.

In the position shown in FIG. 2, the pivot 14 of the lever 13 is inserted in a narrow part of the hollow 15, so as to be vertically retained in place and such that the rotation of the eccentric 11 brings about an oscillating movement of the lever 13 around the pivot 14. When the drive part 16 is brought into its other position, the pivot 14 of lever 13 finds itself in the wide part of the hollow 15 and is therefore no longer able to bear on the drive part 16. As a result, the oscillations of the lever 13 take place around the left end of this lever, which is articulated at 21 on a rod 22, capable of sliding vertically. Therefore, when the pivot 14 is in the wide part of the hollow 15 provided in the drive part 16, the rod 22 stays motionless.

The rod 22 is mounted to slide, its lower part in a sleeve 23, and its upper part in a sleeve 70.

The rod 22 passes through yet another sleeve 27, made of supple material and mounted on a tip 28 provided on a wall 29, in order to prevent the sawdust produced during the machining from entering into the lower part of the driving mechanism for the rod 22. The upper part of this rod 22 carries a slotted hook 33 under which can be engaged a runner 34 which is part of the saw blade 31.

A second fixing element 35 for fastening the upper end of the saw blade is provided on the upper arm 1. This fixing element comprises a rod 36 sliding on two bearings 37 and 38. The lower end of a part 39 hinged on the rod 36, has a hooking portion also in the form of a split or slotted hook 43 (FIG. 5), in order to retain the runner which is rigidly fixed to the upper end of the saw blade 31. Owing to this articulation, the part 39 can be rocked into its non use position 39 shown in phantom line in FIG. 1.

Referring to FIG. 1, the upper fixing element 35 is connected to the lower fixing element 22 by a flexible member 45 in the form of a metallic ribbon or band passing on guide pulleys 46, 47, 48, 49 and 50. This metallic ribbon 45 is fixed to a transversal pin 51 solid with the rod 36. On the lower arm 3, the other end of the metallic ribbon 45 is fastened to a pin 68 of a linking device 57 cooperating with the rod 22. With this arrangement, it can be seen that an upward movement of the rod 22 causes a movement of the rod 36 in the same direction and of the same amplitude.

It should be noted that the pulley 47 is mounted on a pivoting arm 52 cooperating with a cam 53, this cam being connected to a drive knob not shown. Through a rotation of the cam 53, it is possible to change the length of the path of ribbon 45, as well as the tension of this ribbon, once the saw blade 31 is in place. The ribbon 45 also passes on a stretcher formed by two rollers 54 and 55 mounted on a lever 56 which is subjected to the action of a spring not shown. When the blade 31 is removed, for example in order to use another tool on the machine, the lever 56 pivots and the rollers go into the position illustrated in phantom line. This way, the path of the ribbon 45 is lengthened and causes rod 36 to raise inside the arm 1.

As is disclosed in Swiss Pat. No. 654,241, it is possible to fasten a jig or saber saw to the rod 22 instead of the scroll saw blade 31. In this case, the part 39 on the upper arm 1 stays immobile and it is desirable to uncouple the ribbon 45 from the rod 22, to avoid submitting the ribbon to repeated tractions, causing the continuous oscillation of the lever 56. The uncoupling is achieved by the device 57 which is shown in greater detail in FIGS. 3 and 4.

The device 57 comprises a vertical guide 58 fixed on the bottom of the lower arm 3 of the frame. This guide 58 has a slot 59 allowing the sliding of a member 60 made of several parts. This sliding member comprises two plates 61 and 62, connected by means of two screws 63, which traverse two synthetic resin struts 64. These struts are slide forming and can move freely along the slot 59.

Figure 3:
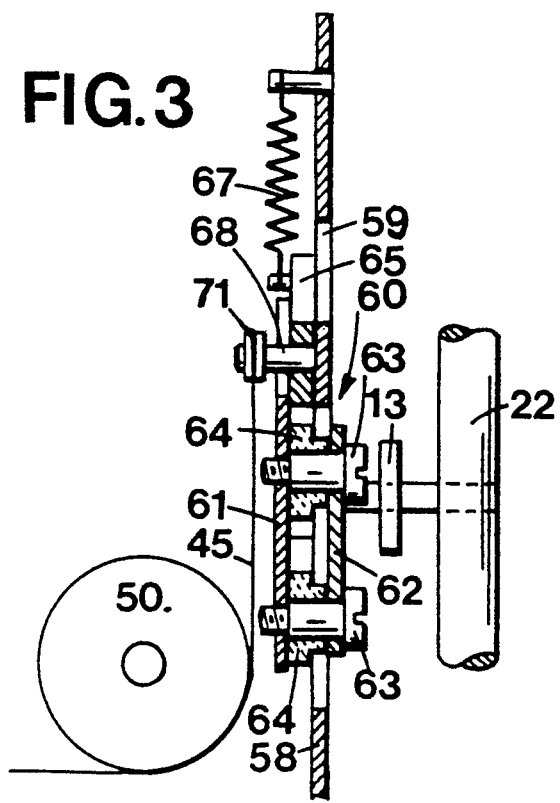
FIGS. 3 and 4 show, on a larger scale, a linking device to which are fastened the ends of the saw blade.

The plate 61 carries a lever 65, articulated at 66 and subjected to the action of a return spring 67. The lever 65 carries a pin 68 which engages in a notch 69 provided in plate 61. As shown in FIG. 3, the end of the flexible tie means 45 is fastened on the pin 68 by way of a part 71. The lever 65 has an end 72 forming a hook and intended to cooperate with a lateral projection 73, consisting in a bar solid with the rod 22. This bar 73 can move in a slot 74 provided in the plate 61.

Figure 4:
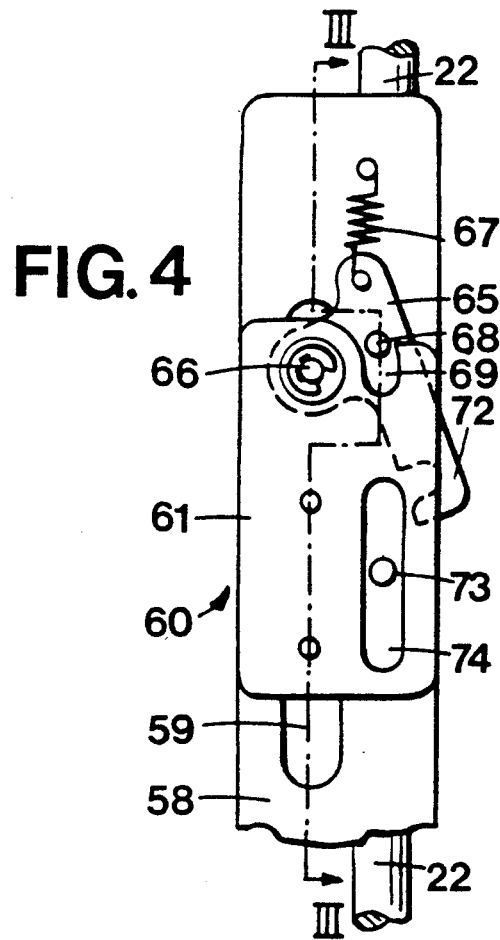

In the position shown in FIG. 4, the linking device is in an uncoupled position since the ribbon 45 is not under tension, thus allowing the spring 67 to bring the lever 65 into the position illustrated. When a saw blade 31 is fastened between the rod 22 and the upper part 39, this causes a tension of the ribbon 45 which, by means of lever 65, moves the sliding member 60 until the upper end of the slot 74 abuts against the bar 73. Once the sliding member 60 is blocked in its position, an increase in the traction of the ribbon 45 causes the lever 65 to pivot against the action of the spring 67 and the hook provided at the end 72 of this lever engages on the bar 73, in such a way that the sliding member 60 is mechanically coupled to the rod 22 in order to allow the use of the scroll saw 31.

In this position, the pin 68 abuts against the bottom of the notch 69 and this prevents the lever 65 from exerting a lateral pressure on the bar 73.

It is clear that once saw blade 31 is removed, the traction of the ribbon 45 vanishes and the spring 67 brings the lever 65 into the position shown in FIG. 4, thus interrupting the connection between the member 60 and the rod 22.

As is better seen on FIG. 5, the articulation of the part 39 takes place on a transveral pivot 40 of the rod 36, and this articulation can be blocked in working position by means of a sliding bolt 41, subjected to the action of an internal spring 42, so as to be kept in engagement with a stop pin 41' solid with the rod 36. The lower end of part 39 has a hooking portion 43 forming a slotted hook so as to retain the runner 44, which is solid with the upper end of the saw blade 31. It can be seen in FIGS. 5 and 6 that each of the runners 34 and 44 provided at the ends of the saw blade 31 has a spherical portion intended to bear against the internal part of the hooks 33 and 43, respectively, this internal part being of complementary shape to that portion.

Figure 7:
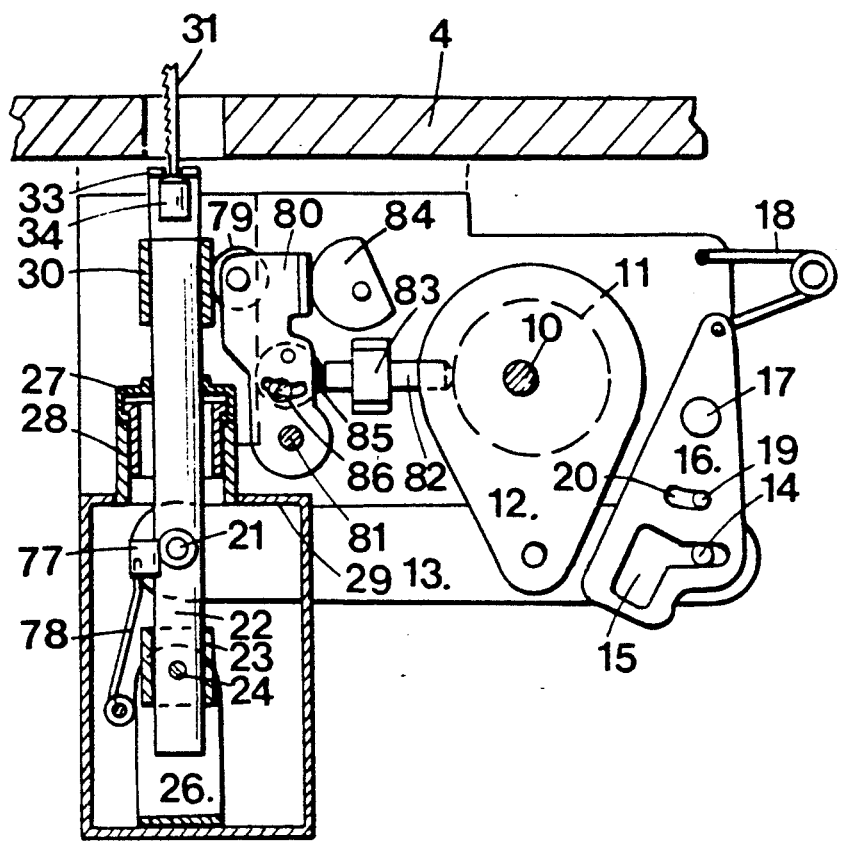
FIG. 7 shows one variant of part of said mechanism.

FIG. 7 shows a variant of the invention in which the mechanism driving the reciprocating movement of the saw 31 has been completed in order to impart transverse periodic movements to the hook 33, relative to its longitudinal movements.

According to this variant, the rod 22 is urged towards the right by way of a pad 77, subjected to the action of a spring 78, in order to press the part 30 against a roller 79, which is fixed on an arm 80, pivoting at 81 on a portion of the frame of the machine. The arm 80 cooperates with a pusher 82, subjected to the action of the eccentric 11 and sliding on a linear bearing sleeve 83, in order to communicate a transverse placement of the rod 22 during its vertical reciprocating movements, and to make it possible to disengage the teeth of the blade 31 on the return upward movement, and thus ease the removal of the sawdust.

An adjusting element is provided, between the arm 80 and the pusher 82, this element taking the form of an eccentric 85 whose position can be blocked by means of a screw 86, in order to make it possible to adjust the vertical position of the blade and thus obtain good working conditions. In addition, an eccentric cam 84 cooperates with the arm 80 so as to limit, in an adjustable way, the displacement of this arm towards the pusher 82. Therefore, through the action of this cam 84, it is possible to change the amplitude of the transverse.

Figure 8:
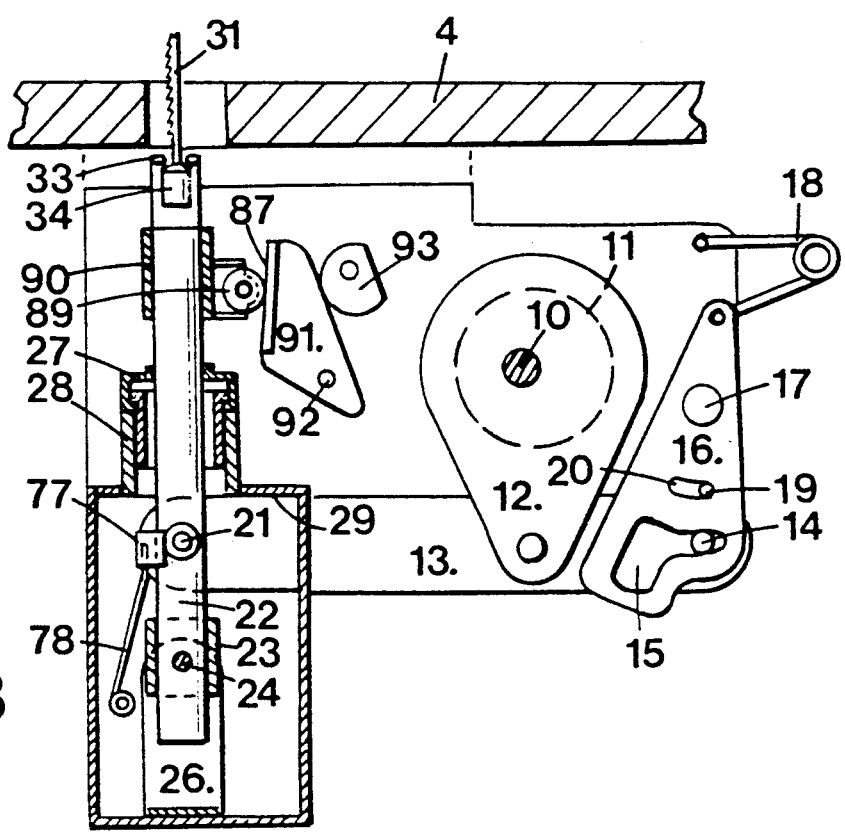
FIG. 8 illustrates a second variant of the mechanism shown in FIG. 7.

In the second variant illustrated in FIG. 8, most of the parts corresponding to the embodiment according to FIG. 7 are designated by the same reference numerals. However, the lateral displacement of the rod 22 is obtained by simpler means, consisting in a ramp 87 on which bears a roller 89, pivotally mounted on a part 90 replacing part 30 of FIG. 7. This ramp 87 is carried by an arm 91, articulated on a pivot 92 and cooperating with a cam 93 whose driving means are not shown. When the cam 93 is made to turn, the arm 91 is made to pivot, so that the slope of the ramp 87 relative to the rod 22 is changed, making it possible to vary the amplitude of the transversal movement of the rod 22. Once the ramp 87 is parallel to the axis of the rod 22, all transverse displacements during operation are suppressed.

As is disclosed in Swiss Pat. No. 654,241, the rod 22 could also be provided with a rigid blade of a jig or saber saw. In this case, the use of mechanisms imparting a transverse movement to the rod 22 is obviously advantageous.

I claim:

1. Machine tool comprising a hollow frame having a lateral upright, said upright linking a horizontal upper arm to a horizontal lower arm, one of said arms having a free end provided with a fixing element for fastening one end of a scroll saw blade and imparting to said blade a longitudinal reciprocating movement, said element being driven in reciprocating movement by a motor housed in said frame, said fixing element being linked to another fixing element in the other of said arms by flexible tie means, said means passing on feed pulleys and imparting the movements of said fixing element driven by the motor to said another fixing element, in order to provide said another fixing element with a force for return of said saw blade, wherein said flexible tie means passes on a stretcher displaceable by an elastic return device effective to bring into a retracted position, whenever said saw blade is removed, said another of said fixing elements which is not driven by said motor, wherein said another fixing element is pivotable about an axis transverse to the axis of the blade to a storage position on said machine.

2. Machine according to claim 1, further comprising an adjusting member for adjusting the position of at least one of said feed pulleys, to make it possible to change the length of the path of said flexible tie means as a function of the length of the saw blade used and, further to adjust the tension exerted by said flexible tie means on said blade.

3. Machine according to claim 1, wherein each of said two fixing elements is provided with a slotted hook, said saw blade being engaged by each of its ends in said hooks, each end of said saw blade comprising a runner having a curved portion intended for bearing against the internal part of the corresponding hook for linking the blade to said elements.

4. Machine according to claim 1, wherein in that said fixing element driven by the motor cooperates with a mechanism imparting transversal periodic movements to said element, relative to its longitudinal reciprocating movements.

5. Machine according to claim 1, characterized by a linking device interconnecting said fixing elements, said device being capable of being uncoupled from said one of said fixing elements.

6. Machine according to claim 5, wherein said linking device is arranged between said fixing element driven by said motor and said flexible tie means.

7. Machine according to claim 6, wherein said linking device has a member for coupling to said fixing element driven by said motor, said coupling member being urged upon by a spring in the uncoupled position, and being under the effect of a traction applied by said flexible tie means, in the coupled position.

8. Machine according to claim 7, wherein said fixing element driven by said motor has a lateral projection, said linking device comprising a member mounted to slide on a guide, said coupling member consisting of a lever pivotally mounted on said sliding member and subjected to the action of a spring hooked to a rigid part of the machine, said lever having a notch intended for engaging on said projection, as well as a seizing point for said flexible tie means.

9. Machine according to claim 1, wherein said flexible tie means passing on feed pulleys is housed inside said hollow frame.

* * * * *